US008796968B2

(12) United States Patent
Soares et al.

(10) Patent No.: US 8,796,968 B2
(45) Date of Patent: Aug. 5, 2014

(54) ANTICIPATORY CONTROL SYSTEM FOR ELECTRIC MOTOR AND ANTICIPATORY CONTROL METHOD FOR ELECTRIC MOTOR APPLIED TO CYCLIC LOADS

(75) Inventors: Claudio Eduardo Soares, Joinville (BR); Dietmar Erich Bernhard Lilie, Joinville (BR); Roberto Andrich, Joinville (BR); Luiz Von Dokonal, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 373 days.

(21) Appl. No.: 13/386,198

(22) PCT Filed: Jul. 22, 2010

(86) PCT No.: PCT/BR2010/000230
§ 371 (c)(1),
(2), (4) Date: Jul. 12, 2012

(87) PCT Pub. No.: WO2011/009180
PCT Pub. Date: Jan. 27, 2011

(65) Prior Publication Data
US 2012/0274250 A1 Nov. 1, 2012

(30) Foreign Application Priority Data

Jul. 22, 2009 (BR) .................................... 0902347

(51) Int. Cl.
*H02K 29/06* (2006.01)
(52) U.S. Cl.
USPC .................................................... 318/400.23
(58) Field of Classification Search
USPC ................... 318/700, 400.01, 400.23
See application file for complete search history.

(56) References Cited

U.S. PATENT DOCUMENTS 6,031,966 A 2/2000 Nakatani et al.
6,414,455 B1 7/2002 Watson
(Continued)

OTHER PUBLICATIONS

International Search Report mailed Jun. 13, 2012 for International application No. PCT/BR2010/000230.

(Continued)

*Primary Examiner* — Shawki S Ismail
*Assistant Examiner* — Zoheb Imtiaz
(74) *Attorney, Agent, or Firm* — Fay Sharpe LLP

(57) ABSTRACT

The present application relates to an anticipatory control system and method for electric motor applied to cyclic loads, said system including an electric motor (10), at least an electronic control unit (20), at least an electronic power unit (30), and at least an electric position-monitoring device. The electric motor (10) is electrically driven by the electronic power unit (30), the electronic power unit (30) is electrically controlled by the electronic control unit (20), the system includes an average speed controller and a device for monitoring the position of the electric motor, both implemented by the electronic control unit (20). The speed controller is designed to monitor an average speed of the electric motor (10), the position-monitoring device is designed to monitor and store an instantaneous speed ($V_i$) in each position of the electric motor (10) and estimate, for each position, an instantaneous control speed ($V_c$) of the electric motor (10), the electronic control unit (20) is designed to calculate an average voltage ($V_m$) from the average speed monitored, and the electronic power unit (30) is designed to drive electrically the electric motor 10 by a control voltage value ($V_{control}$). This control voltage value ($V_{control}$) is calculated by multiplying the average voltage ($V_m$) by the result of the division of the instantaneous control speed ($V_c$) by the average speed.

12 Claims, 9 Drawing Sheets

(56) References Cited

U.S. PATENT DOCUMENTS

Figure 1A:
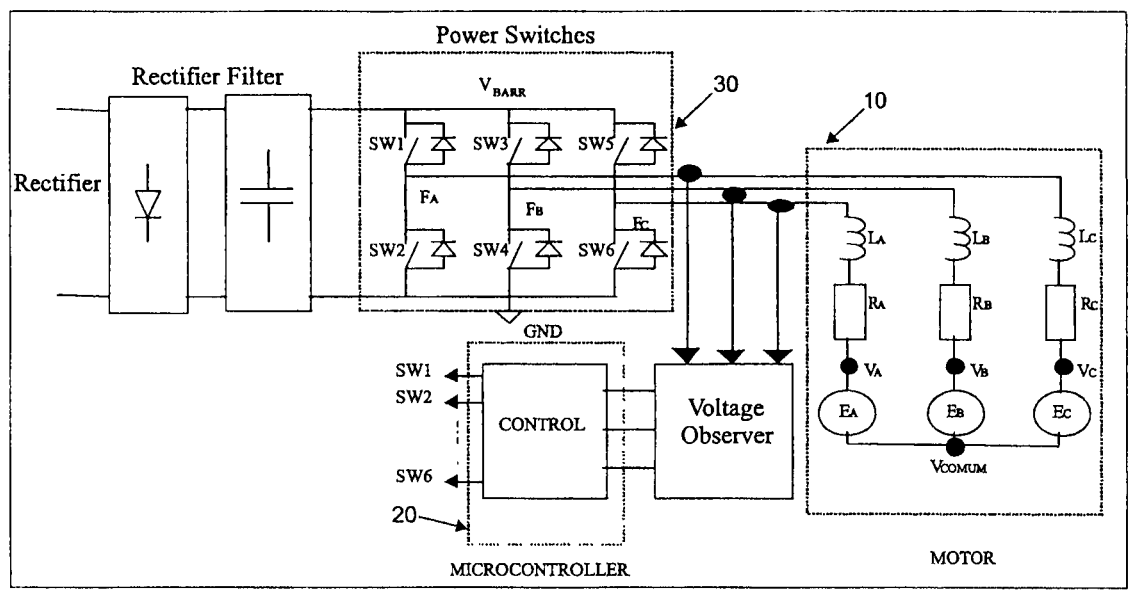

| | | | |
|---|---|---|---|
| 6,922,027 B2 | 7/2005 | Schwarz et al. | |
| 7,075,260 B2 * | 7/2006 | Maeda | 318/443 |
| 2004/0032230 A1 * | 2/2004 | Schwarz et al. | 318/254 |
| 2004/0169482 A1 * | 9/2004 | Maeda | 318/443 |
| 2009/0146592 A1 * | 6/2009 | Tobari et al. | 318/400.02 |

OTHER PUBLICATIONS

Written Opinion mailed Jun. 13, 2012 for International application No. PCT/BR2010/000230.

* cited by examiner (a)

(b)

(a)

(c)

(b)

(d)

(a)

(b)

(a)

(b)

(a)

(c)

(b)

(d)

(a)

(b)

(a)

(c)

(b)

(d)

ANTICIPATORY CONTROL SYSTEM FOR ELECTRIC MOTOR AND ANTICIPATORY CONTROL METHOD FOR ELECTRIC MOTOR APPLIED TO CYCLIC LOADS

The present invention refers to a system especially designed to control permanent magnet motors of the Brushless DC trapezoidal type, with the aim of optimizing the efficiency of electric energy consumption in driving cyclical loads, such as compressors in cooling systems.

Additionally, the present invention provides a control method for motors of this kind, this being implemented in the system now claimed.

DESCRIPTION OF THE STATE OF THE ART

Permanent magnet motors of the Brushless DC type are becoming evermore popular in applications requiring low cost and high performance. Motors of the Brushless DC type are similar to DC motors mounted upside down, where the permanent magnets are mounted on the rotor. While in DC motors the reversal of the current is carried out by the switch and the brushes, in the case of Brushless DC motors, the current is reversed by power inverters which drive the stator coils.

To obtain maximum torque and highest efficiency in the consumption of energy, it is necessary to synchronize the current with the induced voltage in the phases of the motor. This can be done by using sensors coupled to the motor shaft or by observing the induced voltages, or currents, in the motor phases. The sensors coupled to the motor shaft have the drawback of adding extra elements to the design of the motor, considerably increasing the final cost of the solution. Moreover, limitations of space and the environment itself to which the motor is subject, may render the use of these types of sensors unfeasible. This is why the use of voltage or current observers constitutes the best choice in most cases.

U.S. Pat. No. 6,922,027 discloses a technique that uses a voltage observer built with a network formed by voltage comparators, capacitors and resistors. The comparators output is sent to a microprocessor which determines the commutation instants of the motor drive. Although the solution is microprocessed, it requires the use of many external components.

ANDRICH et al. uses a technique where the three phases of the motor are shown, treated mathematically, and then compared with each other to determine the commutation instants of the motor. The advantages of this technique are the elimination of the analogical circuits in determining the position of the motor, the flexibility in the adjustments of the observer according to the mechanical structure of the motor, lower sensitivity to the parametric variations of the components and the possibility of calibrating the circuit.

The Brushless DC Motors can be used in driving the compressors applied to cooling systems. This type of application satisfies the cyclical load conditions defined in the scope of this invention. The aim of applying this type of motor to cooling systems is the variation of the system's cooling capacity, which can be controlled by varying the cooling flow. The cooling flow quantity, in turn, is directly proportional to the average speed of the motor. Accordingly, the main specification of the controller should be the control of the average rotation speed.

The working of the compressor can be divided into two operating stages: the suction stage and the compression stage. Suction occurs at the beginning of each cycle and is characterized by the piston retreat within the cylinder. During this processing, the cylinder is filled with the cooling fluid. The compression cycle, in turn, begins when the piston reverses its displacement direction. During this stage, the fluid is compressed inside the cylinder. Compressing the fluid generates a much greater torque than the average torque resulting from a complete mechanical round. Bearing in mind that this behavior is repeated every mechanical round, a cyclical behavior can be seen in the variation of the torque during the working of the motor.

The torque variation within a mechanical round causes a variation in the motor speed, decreasing the speed of the motor during the compression cycle. Generally, there is no offset in the control action to adjust the instantaneous speed of the motor within a mechanical round, so as to offset the speed during the compression cycle. The controllers developed for driving the compressors assume that what is important for the cooling system is the control of the average cooling flow, which is basically defined by the average rotation speed.

However, the simple control of the average speed of the motor may present distortions in the waveform of the current due to the variation of the rotation during the suction and compression cycles. This deformation in the waveform of the current is not desirable because it decreases the efficiency of the electric energy consumption due to the reduction of the engine power factor.

Bearing in mind the compression cycle, for example, it is noted that the induced voltage in the motor sustains a reduction of amplitude due to the reduction in speed caused by increased torque. Conventional controllers do not act to modify the average voltage applied to the motor and this is why there is an increase in the difference in potential applied to the motor coils, which is defined as being the difference between the voltage applied by the inverter and the induced voltage of the motor. The increase in the difference in potential applied to the motor coils then causes an increase in the current during the compression cycle. In the same way, in the suction cycle the current decreases due to the reduction in amplitude of the induced voltage in the motor.

Hence, the current applied in the motor increases during the compression cycle and decreases during the suction cycle. This behavior is exactly the opposite in the behavior of the induced voltage, which decreases during the compression cycle and increases during the suction cycle. The impact of this reverse behavior between the voltage and the current is on the engine power factor, a factor that decreases as the waveform of the current becomes different to the waveform of the induced voltage.

BRIEF DESCRIPTION AND OBJECTIVES OF THE INVENTION

The objective of the present invention is to improve the Brushless DC motor power factor applied to the drive of cyclical loads, by way of adjusting the waveform of the current applied to the motor. This adjustment in the waveform of the current should be carried out due to the variations in the induced voltage of the motor resulting from variations in speed within a mechanical round.

Adjustments to the waveform of the current are based on the information from prior rounds, bearing in mind that the standard waveform of the torque, speed and induced voltage in the motor should vary little from one mechanical round to the next in the operation of cyclical loads. The proposed control technique leverages this cyclical characteristic of the load to anticipate the adjustments in the voltage applied to the motor. It is as if the control technique could anticipate the load of the motor and predict the impact of this variation on the motor. So the controller is able to anticipate the adjustments needed in the voltage applied to the motor based on this foreseen behavior.

Accordingly, the objectives of the present invention are achieved by providing an anticipatory control system and method for electric motors applied to cyclical loads, said system having an electric motor, comprising at least an electronic control unit, at least an electronic power unit, at least an electric position-observing device, the electric motor being driven electrically by the electronic power unit, the electronic power unit being electrically commanded by the electronic control unit, the system comprising an average speed controller and a position-observing device of the electric motor, both implemented by way of the electronic control unit, the speed controller being arranged to monitor an average speed of the electric motor, the position-observing device being arranged to monitor and store an instantaneous speed in each position of the electric motor and estimate, by way of each position, an instantaneous control speed of the electric motor, the electronic control unit being arranged to calculate an average voltage based on the average speed monitored, the electronic power unit being arranged to electrically drive the electric motor by way of a control voltage value, this control voltage value being calculated by multiplying the average voltage by the result of the division between the instantaneous speed and the average speed.

As mentioned, the objectives of the present invention are further achieved by providing an anticipatory control method for electric motor, said method having the following steps:

i) calculate an average speed of the electric motor;

ii) calculate, using the average speed of the prior step, an average voltage, iii) monitor an instantaneous speed in each position of the electric motor, iv) store one or more instantaneous speed values calculated in the prior step, v) estimate, by way of each position of the electric motor, an instantaneous speed of control of the electric motor, vi) electrically drive the electric motor, by way of a control voltage value, this control voltage value being calculated by multiplying the average voltage by the result of the division between the instantaneous speed of control and the average speed.

In order to implement the adjustment in the waveform of the current, said control method monitors and stores the instantaneous speeds in each position of the motor. As described above, the control method then modifies the voltage to be applied to the motor, multiplying the average voltage previously defined by the speed control by the division between the instantaneous speed and the average speed. The information on instantaneous speed used in this calculation comes from the prior round of the motor, such that the controller is able to anticipate the behavior of the motor. The correction performed in the voltage applied to the motor, in the manner described, manages to adjust the waveform of the current so that it is similar to the waveform of the induced voltage.

This work also highlights that the imposition of any change in the current will occur by way of altering the instantaneous voltage delivered to the motor, without altering the average voltage calculated by the speed control network.

SUMMARY DESCRIPTION OF THE DRAWINGS

Figure 1B:
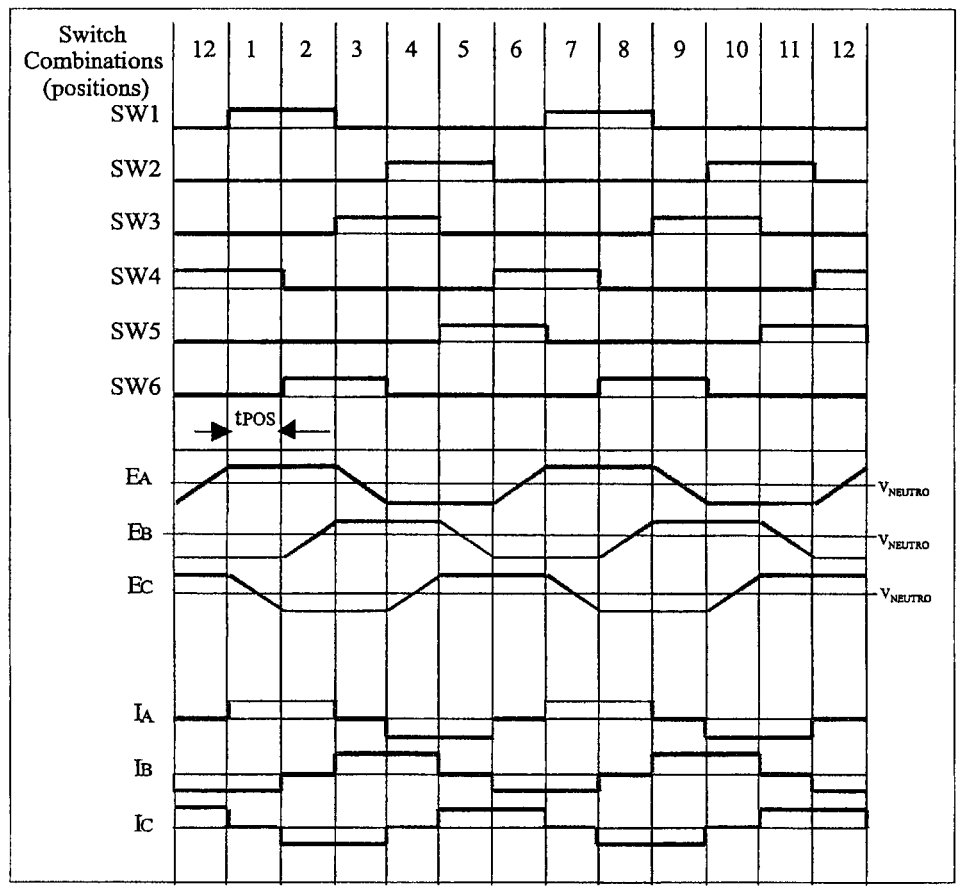
Figure 2:
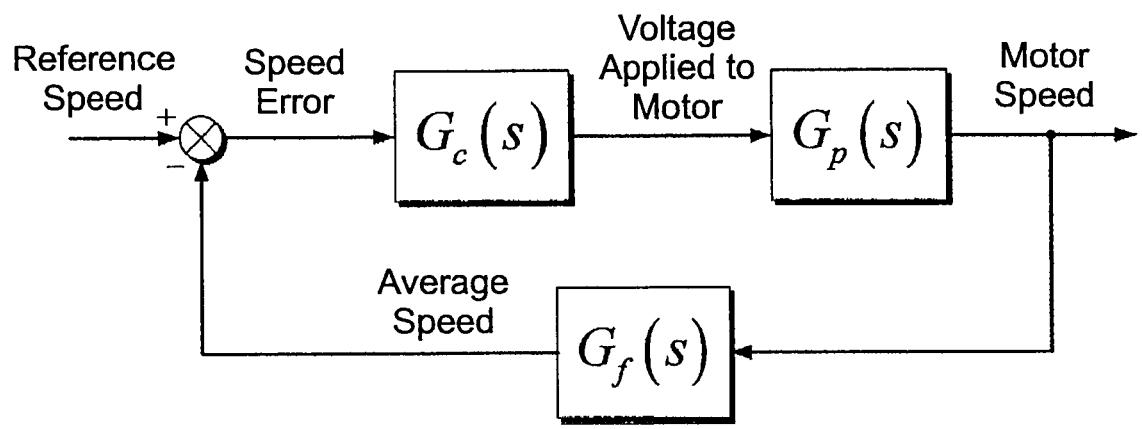
Figure 3:
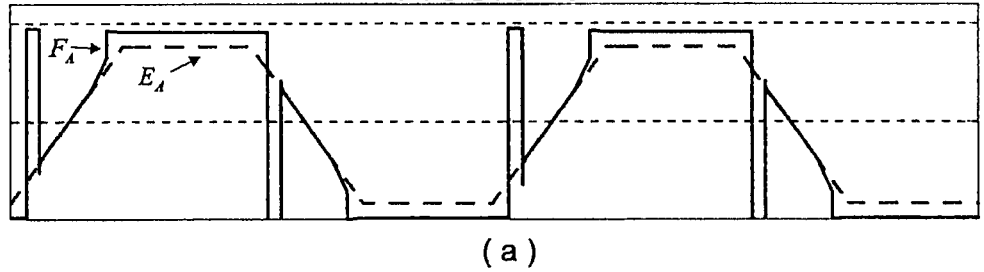
Figure 3:
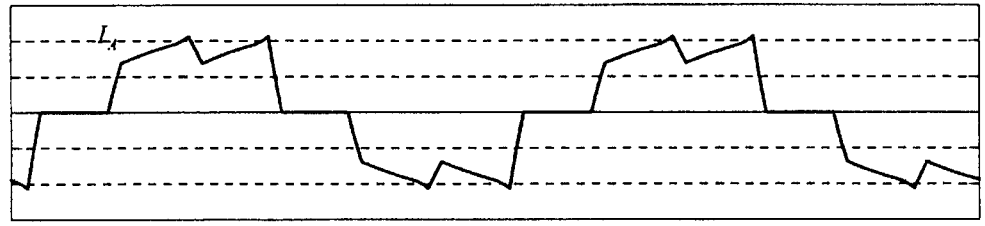
Figure 4:
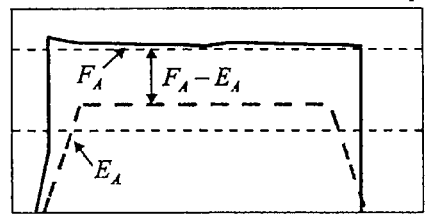
Figure 4:
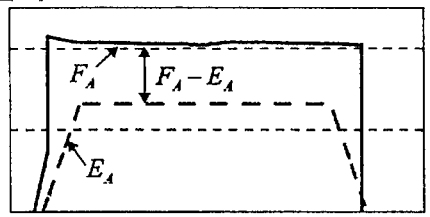
Figure 4:
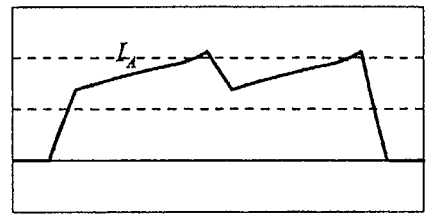
Figure 4:
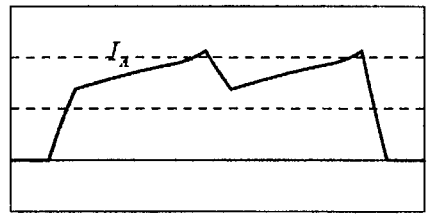
Figure 5:
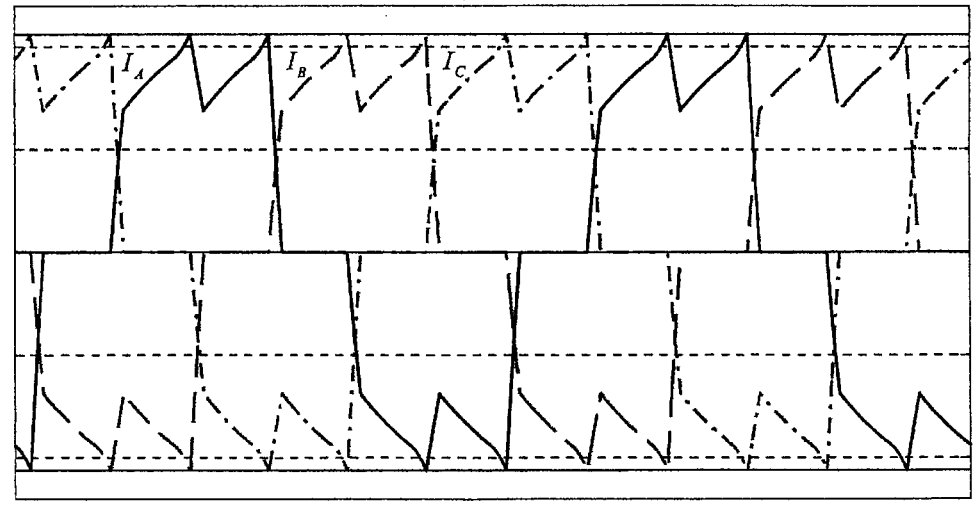
Figure 6:
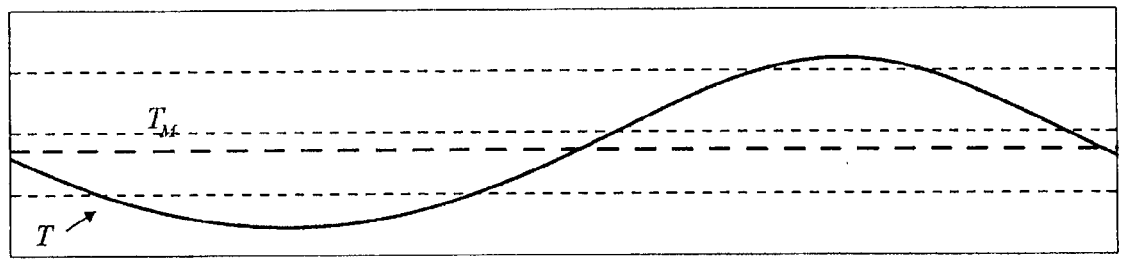
Figure 6:
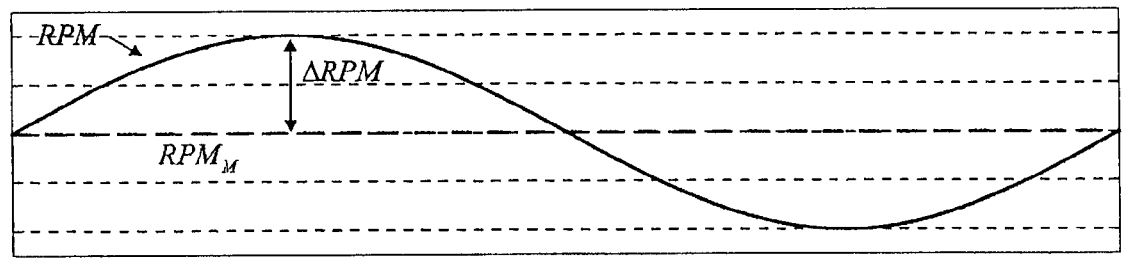
Figure 7:
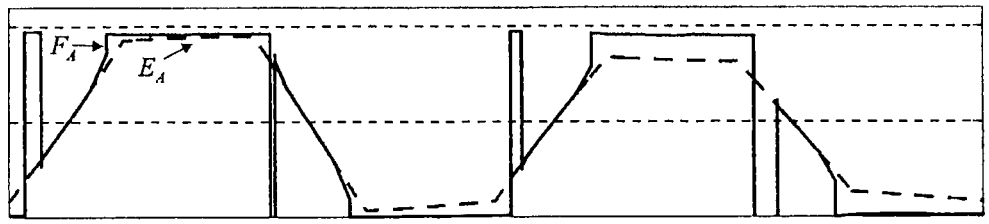
Figure 7:
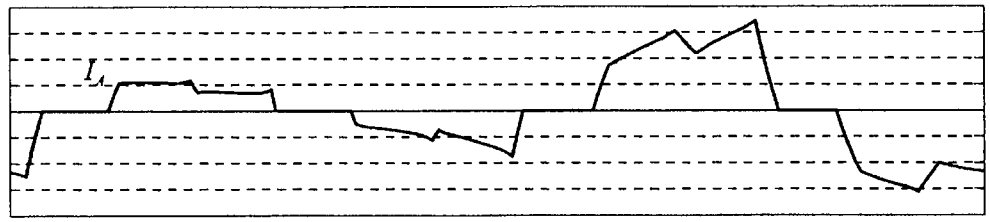
Figure 8:
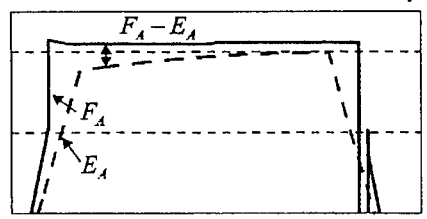
Figure 8:
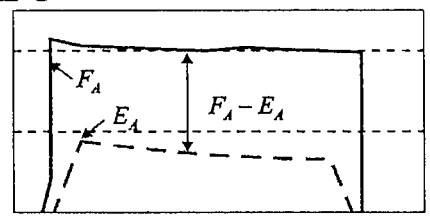
Figure 8:
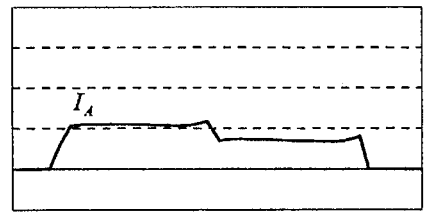
Figure 8:
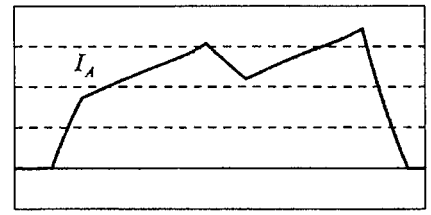
Figure 9:
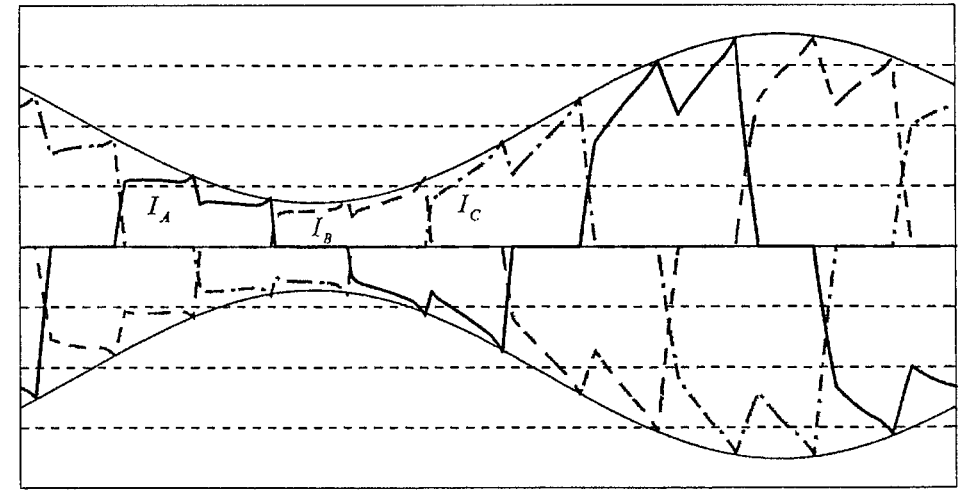
Figure 10:
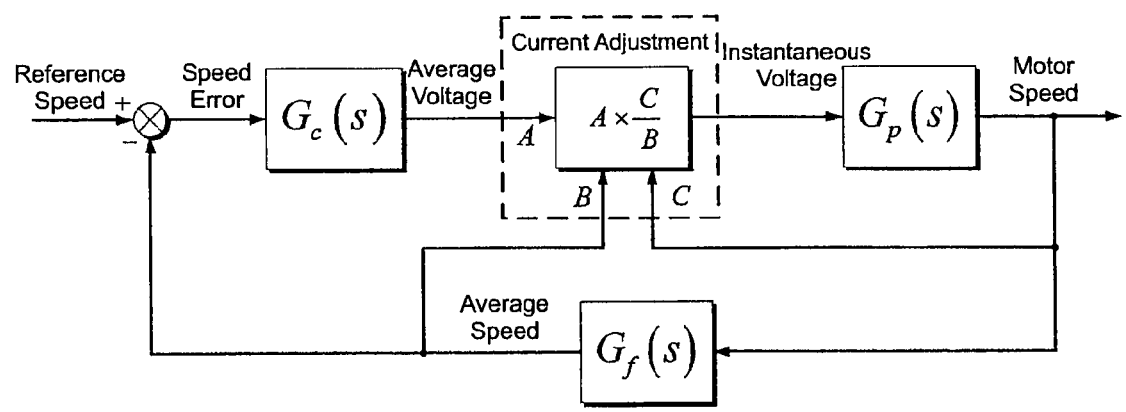
Figure 11:
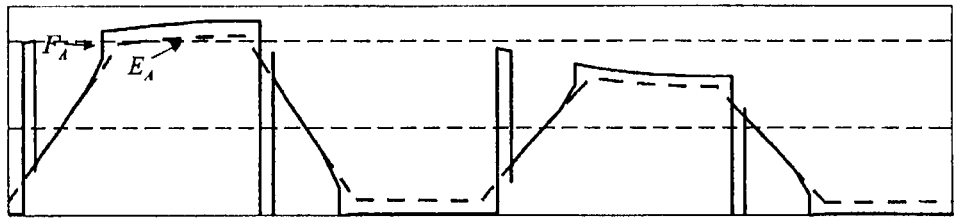
Figure 11:
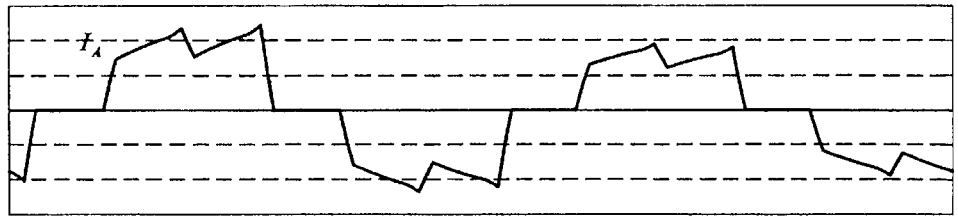
Figure 12:
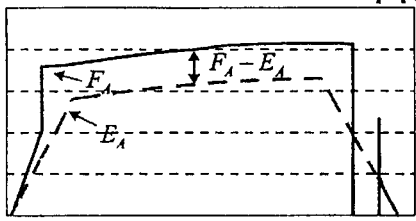
Figure 12:
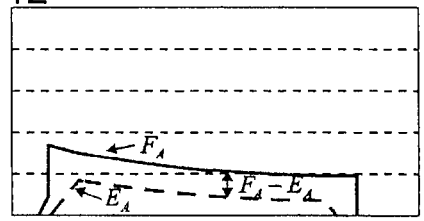
Figure 12:
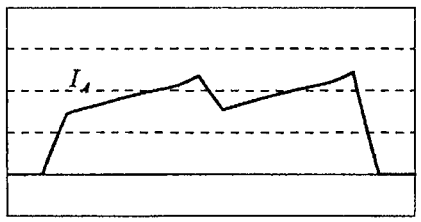
Figure 12:
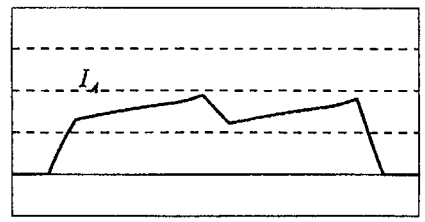
Figure 13:
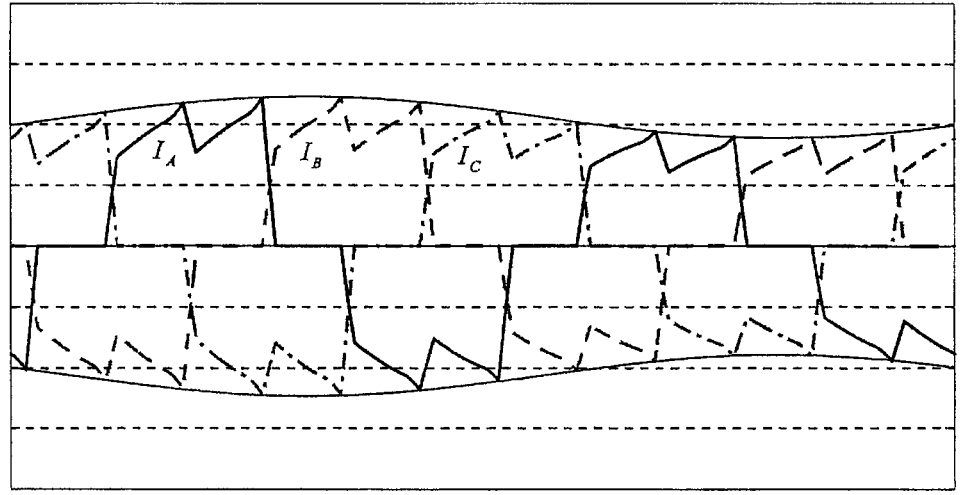
Figure 14:
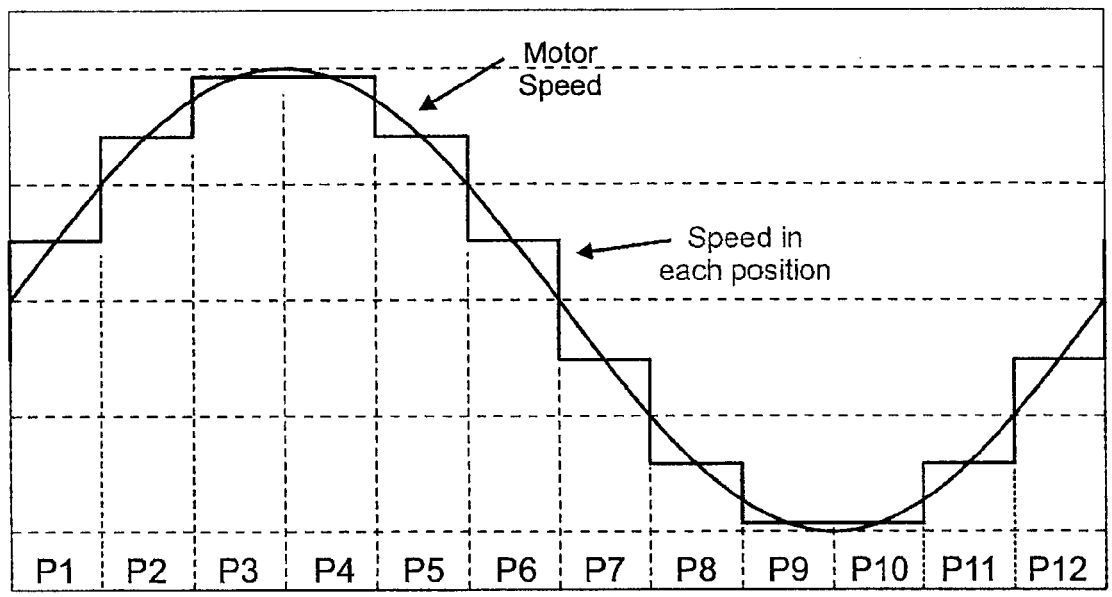
Figure 15:
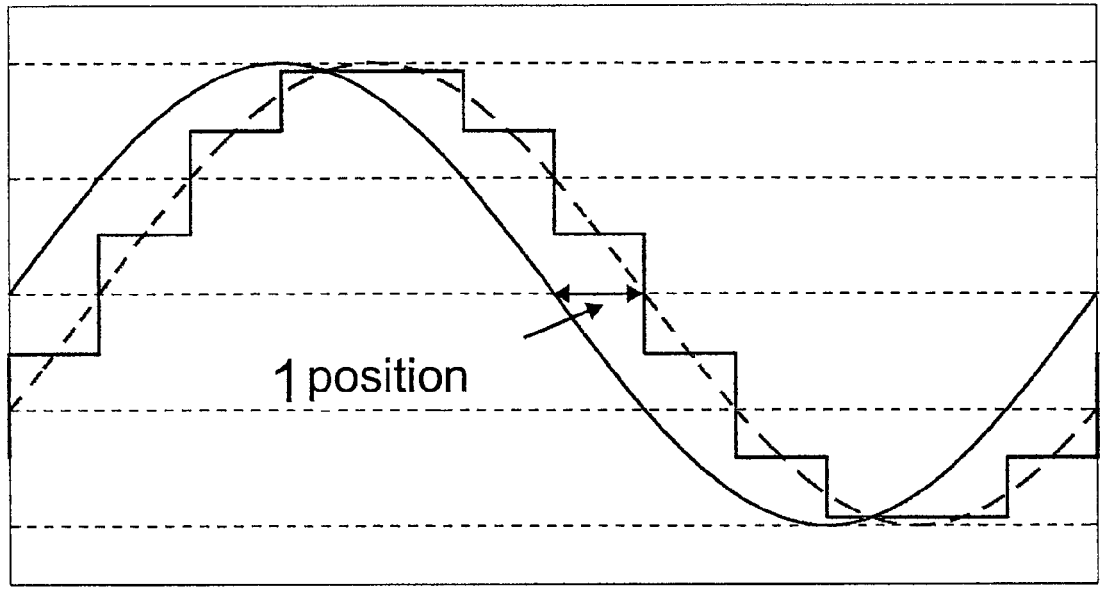
Figure 16:
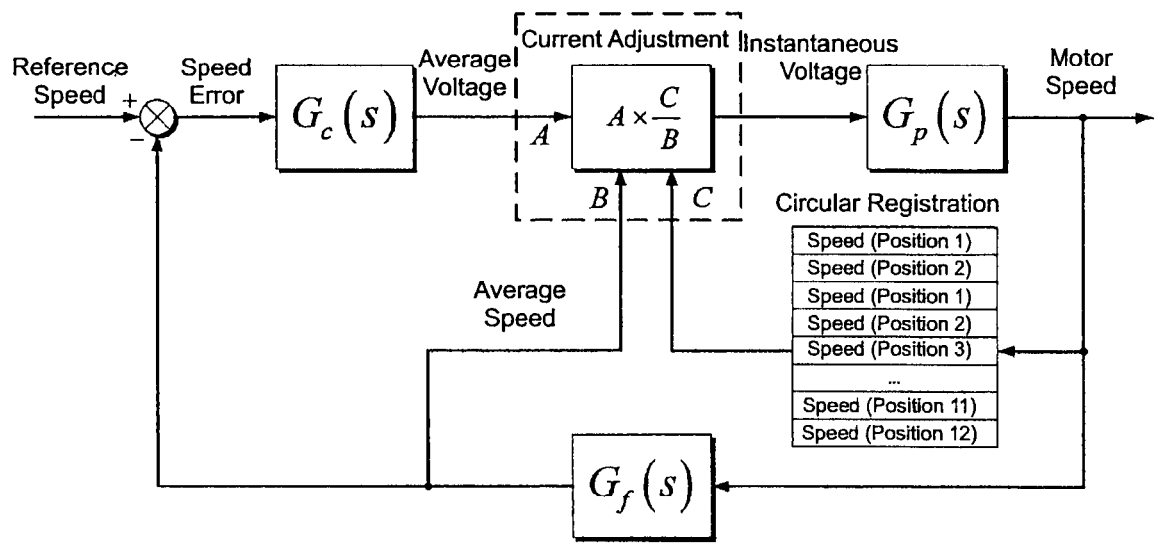

The invention will be described with reference to the accompanying drawings, provided for explanatory purposes and wherein:

FIG. 1: (a) represents a block diagram of a drive system of a permanent magnet motor of the Brushless DC type, three-phase with 4 poles, with trapezoidal voltages at a level of 120° electrical degrees. The diagram comprises a rectifier, a capacitive filter, a three-phase inverter, characterized by the set of power switches, a permanent magnet motor, a voltage observer and a control unit. In (b), the waveforms characteristic of the drive of the electric motor;

FIG. 2: presents the block diagram for driving the electric motor using an average speed controller. The control of this solution is by monitoring the average speed of the motor;

FIG. 3: (a) waveforms of the induced voltage EA and the average voltage applied FA in one of the phases of the motor, to a constant load applied to the motor shaft. In this same case, (b) presents the current waveform of the motor;

FIG. 4: (a) and (c) detail of the difference between the voltage applied to the motor FA and the induced voltage EA in different instants, within a mechanical period. Additionally, (b) and (d) show the respective currents resulting in the motor;

FIG. 5: current in the three phases of the motor resulting from the control method of the average speed applied to a constant load. The currents of the three phases present an identical waveform within a mechanical round;

FIG. 6: characteristic curve of a cyclical load applied to a motor driven by an average speed controller;

FIG. 7: (a) presents the waveforms of the induced voltage EA and of the voltage applied to the motor FA. (b) presents the waveform of the current resulting in the motor. The variation of the induced voltage EA is a direct consequence of the variation of the speed of the motor within a mechanical round;

FIG. 8: (a) detail of the difference between the voltage applied to the motor FA and the induced voltage EA during the instant of maximum speed. (b) current resulting during the instant of maximum speed. (c) detail of the difference between the voltage applied to the motor FA and the induced voltage EA during the instant of minimum speed. (d) current resulting during the instant of minimum speed;

FIG. 9: presents the current in the three phases of the motor resulting from the control method of the average speed applied to the cyclical load;

FIG. 10: block diagram of the control method for improving the motor power factor;

FIG. 11: (a) presents the waveforms of the induced voltage EA and of the voltage applied to the motor FA corrected by the proposed system and control method. (b) presents the waveform of the current resulting in the motor;

FIG. 12: (a) detail of the voltage applied to the motor FA corrected by the control method proposed and the induced voltage EA during the instant of maximum speed. (b) current resulting during the instant of maximum speed. (c) detail of the voltage applied to the motor FA corrected by the control method proposed and the induced voltage EA during the instant of minimum speed. (d) current resulting during the instant of minimum speed;

FIG. 13: presents the current in the three phases of the motor corrected by the control method that is the object of the present invention;

FIG. 14: presents the average speed in each position acquired by a speed observer, jointly with the real speed of the motor, pursuant to the teachings of the present invention;

FIG. 15: shows the existing delay in speed measurement, characterized by the difference between the real speed and the speed measured by the instants of commutation, pursuant to the teachings of the present invention; and FIG. 16: shows the storage of the instantaneous speed in each position of the motor, as disposed in the control block diagram of this invention.

DETAILED DESCRIPTION OF THE DRAWINGS

FIG. 1 (a) shows the basic arrangement of a control diagram and (b) the ideal waveforms existing in the drive of an electric motor 10, in this case a permanent magnet motor of the Brushless DC type three-phase with four poles, trapezoidal wave. By way of example, hereinafter, this motor shall be used for analyzing the remaining graphics. However, the invention is also valid for any permanent magnet motor of the Brushless DC type. However, the invention is also valid for any permanent magnet motor of the Brushless DC type. Under normal working, the control analyzes the input of the voltage and/or current observer and drives switches SW1 to SW6 in the sequence indicated in FIG. 1 (b), pursuant to the position detected.

Additionally, it is known that by using sensors coupled to the motor shaft, observers of induced voltages, or currents, it is possible to measure the speed of the motor. In the proposed arrangement, a voltage observer as illustrated in FIG. 1 (a) was used, although any other speed measuring device can be applied to the invention presented.

FIG. 2 shows a block diagram of a typical control operated based on the average speed of an electric motor. This arrangement shows the motor and the inverter, as well as a sensor which can monitor the speed. configuring a controller is responsible for processing the information on speed coming from the sensor jointly with the reference, or setpoint, defined by the system.

FIG. 3, in turn, presents the response of the electric motor driven by a conventional controller of average speed for the case of imposing a constant load on the shaft. The condition of the constant load is favorable to this kind of control, since the real rotation speed remains constant during a mechanical cycle. This constant behavior of the speed is reflected in the induced voltage waveform in the motor. As per FIG. 3 (a), the induced voltage maintains a uniform shape, that is, it does not alter during a mechanical cycle. As a consequence, the waveform resulting from the current in the motor also assumes a uniform behavior, and does not alter during the mechanical round, as presented in FIG. 3 (b).

FIGS. 4 (a) and (c) detail the difference between induced voltage EA and the voltage FA applied to the motor, which remains approximately constant within a mechanical round. FIGS. 4 (b) and (d) show that the waveforms of the phase current resulting in the motor are also identical within a mechanical round, due to the maintenance of the difference between the induced voltage EA and the voltage FA applied to the motor.

Consequently, as can be seen in FIG. 5, the waveforms of the currents resulting in the three phases of the motor are identical, not demonstrating any kind of distortion during the mechanical cycle.

However, it is important to point out the difference in the impacts for a constant load when compared to those coming from a cyclical load on the shaft of the motor. FIG. 6 presents an example of cyclical load, which is comprised of an oscillation around an average TM operating point. A load with a typically cyclical characteristic is the load generated by an alternative compressor. The impact on the motor speed, operating by conventional controller of average speed, is an oscillation around the average speed RPMM.

The speed oscillation causes a variation in amplitude of the induced voltage EA, which is shown in FIG. 7. As the voltage applied to the motor FA by the speed controller is constant during a mechanical round, the higher the induced voltage EA the lower the IA current resulting from the motor.

Therefore, during the instant of maximum speed, highlighted in FIGS. 8 (a) and (b), the induced voltage EA comes very close to the voltage applied to the motor FA. As a consequence, there is a decrease in the amplitude of the IA current. During the instant of minimum speed, highlighted in FIGS. 8 (c) and (d), the reverse phenomenon occurs.

The impact of the variation in speed on the currents of the motor is summarized in FIG. 9, clearly showing the distortion of the currents of phases IA, IB and IC within a mechanical round. The decrease of the current resulting in the motor during the increase of the induced voltage, or the increase of the current during the decrease of the induced voltage, directly impacts the reduction of the engine power factor.

In order to improve the motor power factor, the current should have the same format as the induced voltage. Therefore, a control system, for example, such as that proposed in the present invention, should act to reduce the induced voltage in the motor when a reduction in the operating current occurs, at the same time in which it raises the induced voltage in the motor when the current in the motor is increased.

But the phenomenon that occurs using the conventional speed controller conventional is precisely the opposite. This current variation which is disproportional to the induced voltage during a mechanical round of the motor prejudices the motor power factor and consequently decreases the efficiency of the system.

Along these lines, the objective of the system and method now proposed is to improve the motor power factor applied to the drive of the cyclical loads, whereby adjusting the waveform of the current.

A way of acting to adjust the current of the motor is illustrated in the block diagram of FIG. 10.

Said control acts to adjust the waveform of the current, monitoring the instantaneous speed and the average speed of the motor. In contrast, the control illustrated in FIG. 10 has the technical drawback of needing real-time monitoring and control, in addition to high-capacity processing hardware.

Within the teachings of the present invention, a system and a control method are proposed so as to work with estimated and stored speed values, it being possible to predict the behavior of the motor during its working, differently to that which occurs in the solution presented in FIG. 10.

Accordingly, the present control system, called anticipatory control system for electric motor applied to cyclical loads, comprises an electric motor 10, at least an electronic control unit 20 and at least an electronic power unit 30. FIG. 1 illustrates an implementation possibility of the object now claimed.

Furthermore, it is worth mentioning that the electric motor 10 is electrically driven by way of the power unit 30. The electronic power unit 30 comprises a set of electronic power switches SW2N arranged to control a voltage of each phase of the electric motor 10.

The same FIG. 1 shows that the electronic power unit 30 is electrically commanded by way of the electronic control unit 20.

An innovative characteristic of the present invention refers to the fact that the control system comprises an average speed controller and an electric position-observing device of the electric motor, both implemented by way of the electronic control unit 20.

The average speed controller is especially arranged to monitor an average speed of the electric motor 10, whereas the position-observing device is arranged to monitor and store an instantaneous speed $V_i$ in each position of the electric motor 10.

Accordingly, it is possible to estimate, by way of each position, an instantaneous speed of control $V_c$ of the electric motor 10.

Next, the electronic control unit 20 is arranged to calculate an average voltage $V_m$ based on the average speed monitored, whereas the electronic power unit 30 is arranged to electrically drive the electric motor 10 by way of a control voltage value $V_{control}$.

Said control voltage value $V_{control}$ is calculated by multiplying the average voltage $V_m$ by the result of the division between the instantaneous speed of control $V_c$ and the average speed $RPM_{average}$.

Based on the above, the present control system modifies the voltage to be applied to the motor based on the equation below:

$$V_{ins} = V_m \times \frac{V_c}{RPM_{médio}}$$

The correction carried out in the voltage applied to the motor, as described, manages to adjust the waveform of the current so that it is similar to the waveform of the induced voltage. FIG. 11 (a) presents the waveforms of the induced voltage EA and of the voltage applied to the motor FA. The amplitude of the corrected current IA, shown in FIG. 11 (b), is thereafter directly proportional to the induced voltage EA.

In other words, the control voltage value $V_{control}$ is calculated so as to provide a current waveform of the electric motor 10 substantially aligned to a waveform of the induced voltage in the electric motor 10.

Hence, during the instant of maximum speed, highlighted in FIGS. 12 (a) and 12 (b), the voltage applied FA to the motor is increased, providing an increase in the amplitude of the current IA. During the instant of minimum speed, highlighted in FIGS. 12 (c) and 12 (d), the reverse phenomenon occurs.

The result of the adjustment of the currents of phases IA, IB and IC is presented in FIG. 13. Although it may appear odd, the oscillations now presented by the current favor the improvement of the power factor, as they are in phase with the same variations presented by the induced voltage.

Additionally, the present invention has, advantageously compared to prior arts, an anticipatory control system, since the instantaneous speed V is a sample of the prior round of the electric motor 10, such that the system anticipates the behavior of the cyclical loads.

Within the teachings of the present invention, it is therefore possible to use a very simple speed observer, based merely on the instants of commutation. In this type of speed observer, the speed in each position is defined based on the time it remains in each position. The output of this kind of observer is a signal sampled with the value of the average speed in each position, as shown in FIG. 14. Accordingly, the position-observing device operates in such a way as to configure a speed observer.

The speed observer therefore operates like a timer arranged to monitor a response from the position sensor.

Thus, the value of the average speed calculated in the present invention is obtained at the end of each position, which implies in a delay of a position in reading the speed in each position. FIG. 15 shows the difference between the real speed and the speed measured by way of instants of commutation. Therefore, the invention manages to overcome the limitations imposed by this delay in measuring the speed.

For this, the adjustments in the waveform of the current are based on the information of the prior rounds, bearing in mind that the standard waveform of the torque, speed and voltage induced in the motor should vary little from one mechanical round to the next in the cyclical load operations. The proposed control technique takes advantage of this cyclical characteristic of the load so it can anticipate the voltage adjustments applied to the motor.

Said control is as if the proposed technique anticipated the load of the motor and could predict the impact of this variation on the motor. The controller can then anticipate the adjustments needed in the voltage applied to the motor based on the foreseen behavior.

In order to implement the adjustment in the waveform of the current, the control system monitors and stores the instantaneous speed in each position of the motor, as presented by the block diagram in FIG. 16.

It is important to point out that the present control system is arranged so as to apply a constant voltage to the electric motor 10 during each of the commutation positions. The voltage applied in each position of the electric motor 10 is given based on the rotations measured in each position.

Preferably, the system now proposed uses a filter arranged to optimize the speed reading of the electric motor 10. As already mentioned, the present invention is preferably idealized for an electric motor 10 of the Brushless DC type. It can, however, be applied to motors having similar characteristics.

An additional characteristic of the present invention takes into account an anticipatory control method for electric motor 10 applied to cyclical loads. Said method comprises the following steps:

i) calculate an average speed of the electric motor 10;

ii) calculate, using the average speed of the prior step, an average voltage $V_m$, iii) monitor an instantaneous speed $V_i$ in each position of the electric motor 10, iv) store one or more instantaneous speed Vi values calculated in the prior step, v) estimate, by way of each position of the electric motor 10, an instantaneous speed of control $V_c$ of the electric motor 10, and vi) electrically drive the electric motor (10), by way of a control voltage value $V_{control}$ this control voltage value being $V_{control}$ calculated by multiplying the average voltage $V_m$ by the result of the division between the instantaneous speed of control $V_c$ and the average speed.

Said method is idealized so as to implement its steps by way of the control system described above.

In light of the above, it can be said that the present invention achieves its objectives insofar as a system and control method for electric motor 10 are proposed, and capable of improving the drive of said motor focusing on the greater power factor of the machine, viewing greater efficiency in terms of electric energy consumption during the drive of the cyclical loads.

Having described an example of a preferred embodiment, it should be understood that the scope of the present invention encompasses other possible variations, and is only limited by the content of the claims appended hereto, potential equivalents being included therein.

The invention claimed is:

1. Anticipatory control system for electric motor applied to cyclical loads, the control system comprising:
an electric motor (10);
at least an electronic control unit (20);
at least an electronic power unit (30);

the electric motor (10) being electrically driven by the electronic power unit (30);

an electronic power unit (30) being electrically commanded by way of the electronic control unit (20), the anticipatory control system further comprising an average speed controller and an electric position-observing device of the electric motor, both implemented by way of the electronic control unit (20), the average speed controller being arranged to monitor an average speed of the electric motor (10), the position-observing device being arranged to monitor and store an instantaneous speed ($V_i$) in each position of the electric motor (10) and estimate, by way of each position, an instantaneous speed of control ($V_c$) of the electric motor (10), the electronic control unit (20) being arranged to calculate an average voltage ($V_m$) based on the average speed monitored, the electronic power unit (30) being arranged to electrically drive the electric motor (10) by way of a control voltage value ($V_{control}$), this control voltage value ($V_{control}$) being calculated by multiplying the average voltage ($V_m$) by the result of the division between the instantaneous speed of control ($V_c$) and the average speed.

2. System according to claim 1, wherein the electric motor (10) is of the Brushless DC type.

3. System according to claim 1, wherein the electronic power unit (30) comprises a set of electronic power switches (SW2N) arranged to control a voltage in each phase of the electric motor (10).

4. System according to claim 1, wherein the control voltage value ($V_{control}$) is calculated so as to provide a waveform of the current of the electric motor (10) substantially aligned to a waveform of the induced voltage in the electric motor (10).

5. System according to claim 1, wherein the instantaneous speed ($V_i$) comprises a sample of the prior round of the electric motor (10) such that the system anticipates a behavior of the cyclical loads.

6. System according to claim 1, wherein the position-observing device operates so as to arrange a speed observer.

7. System according to claim 6, wherein the speed observer comprises a timer arranged to monitor a response from the position sensor.

8. System according to claim 6, wherein said system is arranged to apply a constant voltage to the electric motor (10) during each of the commutation positions.

9. System according to claim 8, wherein the voltage applied in each position of the electric motor (10) is given based on the rotations measured in each position.

10. System according to claim 1, further comprising a filter arranged to optimize the reading of the speed of the electric motor (10).

11. Anticipatory control method for electric motor (10) applied to cyclical loads, the method comprising the following steps:

i) calculating an average speed of the electric motor (10);

ii) calculating, using the average speed, an average voltage ($V_m$), iii) monitoring an instantaneous speed ($V_1$) in each position of the electric motor (10), iv) storing one or more instantaneous speed ($V_i$) values calculated in the prior step, v) estimating, by way of each position of the electric motor (10), an instantaneous speed of control ($V_e$) of the electric motor (10), vi) electrically driving the electric motor (10), by way of a control voltage value ($V_{control}$), this control voltage value being ($V_{control}$) calculated by a method comprising multiplying the average voltage ($V_m$) by the result of the division between the instantaneous speed of control ($V_c$) and the average speed.

12. Anticipatory control method for electric motor (10) according to claim 11, wherein the steps are implemented by way of a control system defined comprising:

an electric motor (10);

at least an electronic control unit (20);

at least an electronic power unit (30);

the electric motor (10) being electrically driven by the electronic power unit (30);

an electronic power unit (30) being electrically commanded by way of the electronic control unit (20), the anticipatory control system further comprising an average speed controller and an electric position-observing device of the electric motor, both implemented by way of the electronic control unit (20), the average speed controller being arranged to monitor an average speed of the electric motor (10), the position-observing device being arranged to monitor and store an instantaneous speed ($V_i$) in each position of the electric motor (10) and estimate, by way of each position, an instantaneous speed of control ($V_c$) of the electric motor (10), the electronic control unit (20) being arranged to calculate an average voltage ($V_m$) based on the average speed monitored, the electronic power unit (30) being arranged to electrically drive the electric motor (10) by way of a control voltage value ($V_{control}$), this control voltage value ($V_{control}$) being calculated by multiplying the average voltage ($V_m$) by the result of the division between the instantaneous speed of control ($V_c$) and the average speed.

\* \* \* \* \*